United States Patent
Desai et al.

(10) Patent No.: US 9,604,592 B2
(45) Date of Patent: Mar. 28, 2017

(54) AIR CURTAIN UNIT INCLUDING MOUNTING CLIP

(71) Applicant: Ford Global Technologies, LLC, Dearborn, MI (US)

(72) Inventors: Manoj Desai, Novi, MI (US); Brian Robert Spahn, Plymouth, MI (US); Jeffrey Charles Paddock, Dearborn Heights, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/753,498

(22) Filed: Jun. 29, 2015

(65) Prior Publication Data

US 2016/0375853 A1    Dec. 29, 2016

(51) Int. Cl.
*B60R 21/213* (2011.01)
*B60R 21/232* (2011.01)

(52) U.S. Cl.
CPC .......... *B60R 21/232* (2013.01); *B60R 21/213* (2013.01)

(58) Field of Classification Search
CPC ... B60R 21/213; B60R 21/232; B60R 21/217; B60R 21/2171; B60R 2021/161; B60R 21/201
See application file for complete search history.

(56) References Cited

U.S. PATENT DOCUMENTS

| | | | | |
|---|---|---|---|---|
| 5,536,041 A | * | 7/1996 | Acker | B60R 21/2171 280/740 |
| 5,791,683 A | * | 8/1998 | Shibata | B60R 21/201 280/730.1 |
| 6,073,961 A | * | 6/2000 | Bailey | B60R 21/232 280/729 |
| 6,082,761 A | * | 7/2000 | Kato | B60R 21/213 280/728.2 |
| 6,106,006 A | * | 8/2000 | Bowers | B60R 21/213 280/730.2 |
| 6,142,509 A | * | 11/2000 | White, Jr. | B60R 13/0206 280/728.2 |
| 6,173,990 B1 | * | 1/2001 | Nakajima | B60N 2/002 280/730.2 |
| 6,224,087 B1 | * | 5/2001 | Stutz | B60R 21/213 280/728.2 |
| 6,224,089 B1 | * | 5/2001 | Uchiyama | B60R 21/23 280/728.2 |

(Continued)

FOREIGN PATENT DOCUMENTS

| | | | |
|---|---|---|---|
| EP | 1710135 A1 * | 10/2006 | ........... B60R 21/201 |
| KR | 20030097137 | 12/2003 | |

(Continued)

*Primary Examiner* — Laura Freedman
(74) *Attorney, Agent, or Firm* — Frank A. MacKenzie; Bejin Bieneman PLC

(57) ABSTRACT

An air curtain unit of a vehicle includes an inflator assembly and an air curtain that is in fluid communication with the inflator assembly. A clip includes a hook that extends at least partially around the air curtain. The clip includes a mounting portion that is fixed to the hook and is engaged with the inflator. The mounting portion of the clip supports the air curtain relative to the inflator assembly, and the hook of the clip supports the air curtain in a desired location.

17 Claims, 8 Drawing Sheets

(56) References Cited

U.S. PATENT DOCUMENTS

| | | | | |
|---|---|---|---|---|
| 6,293,581 | B1* | 9/2001 | Saita | B60R 21/213 280/730.2 |
| 6,364,349 | B1* | 4/2002 | Kutchey | B60R 21/213 280/728.3 |
| 6,485,048 | B2* | 11/2002 | Tajima | B60N 2/4876 280/728.2 |
| 6,565,116 | B1* | 5/2003 | Tajima | B60R 13/0206 24/297 |
| 6,722,693 | B2* | 4/2004 | Ikeda | B60R 21/232 280/730.2 |
| 6,964,431 | B2* | 11/2005 | Nakamura | B60R 21/201 280/743.2 |
| 7,077,424 | B2* | 7/2006 | Inoue | B60R 21/213 280/730.2 |
| 7,125,037 | B2* | 10/2006 | Tallerico | B60R 21/201 280/728.2 |
| 7,159,894 | B2* | 1/2007 | Ronne | B60R 21/213 280/728.2 |
| 7,159,896 | B2* | 1/2007 | Ochiai | B60R 21/201 280/730.2 |
| 7,168,735 | B2* | 1/2007 | Kino | B60R 21/213 280/730.2 |
| 7,175,196 | B2* | 2/2007 | Boxey | B60R 21/2171 280/730.2 |
| 7,597,345 | B1 | 10/2009 | Kim | |
| 7,607,685 | B2* | 10/2009 | Jang | B60R 21/213 280/730.2 |
| 7,976,055 | B2 | 7/2011 | Son | |
| 8,096,574 | B2* | 1/2012 | Okimoto | B60R 21/213 280/728.2 |
| 8,172,258 | B2 | 5/2012 | Kim et al. | |
| 8,505,962 | B2* | 8/2013 | Henriksson | F16L 33/02 280/728.2 |
| 8,820,779 | B1* | 9/2014 | Low | B60R 21/232 280/728.2 |
| 2002/0158451 | A1* | 10/2002 | Nusshor | B60R 21/237 280/730.2 |
| 2006/0006630 | A1* | 1/2006 | Schwarz | B60R 21/2171 280/728.2 |
| 2006/0255568 | A1* | 11/2006 | Demel | B60R 21/213 280/728.2 |

FOREIGN PATENT DOCUMENTS

| | | | | |
|---|---|---|---|---|
| KR | 20060089256 | | 8/2006 | |
| KR | 100778580 | | 11/2007 | |
| KR | 20130125995 | | 11/2013 | |
| SE | DE 102006041704 A1 * | | 3/2008 | B60R 21/213 |

* cited by examiner

AIR CURTAIN UNIT INCLUDING MOUNTING CLIP

BACKGROUND

Vehicles, such as automobiles, can include various airbag units that are deployed when an impact of the vehicle is sensed. When deployed, the airbag unit may slow movement of an occupant of the vehicle and may absorb energy from the occupant during the impact. One type of airbag unit, for example, is a side air curtain. The side air curtain may include an inflator and an airbag. The side air curtain may be mounted to a roof and/or body side of the vehicle behind the trim and the headliner. When an impact is sensed by an impact sensing system of the vehicle, the airbag may be deployed from the headliner between the occupant and a side of the vehicle, e.g., a window, door, pillar, trim, etc., in a manner that may absorb energy from the occupant.

The design of vehicle components are subject to several constraints such as packaging, assembly, and operability considerations. For example, a roof of the vehicle may include roof reinforcements, which may consume space between the roof and the headliner and create packaging constraints for the side air curtain. In addition, the design of the vehicle, e.g., the design of the roof, headliner, etc., may affect the direction of deployment of the airbag. Therefore, there remains an opportunity to design a side air curtain that accommodates these design considerations.

DETAILED DESCRIPTION

Figure 1:
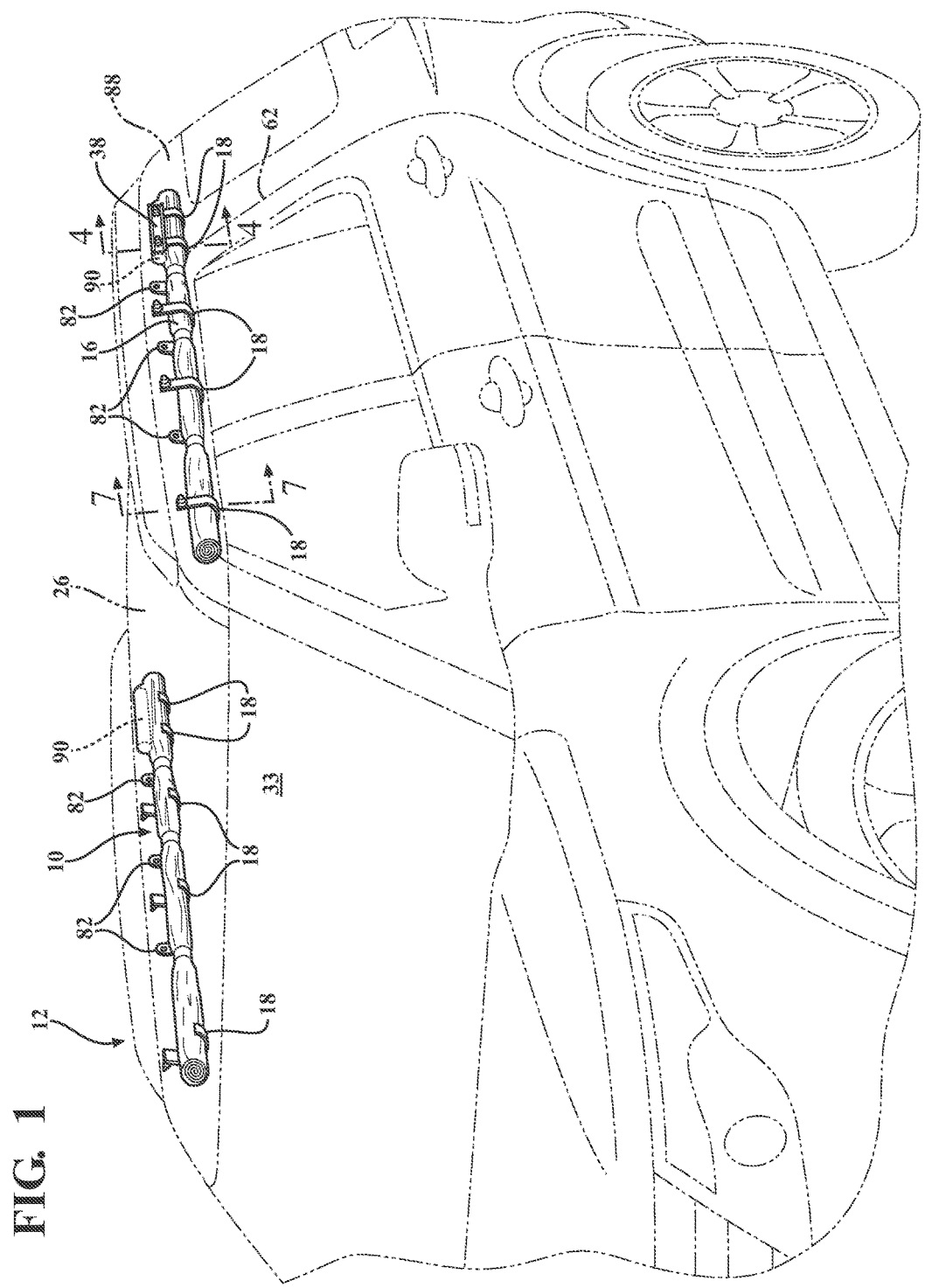
FIG. 1 is a perspective view of an air curtain unit mounted to a vehicle.

With reference to the Figures, wherein like numerals indicate like parts throughout the several views, FIG. 1 shows an air curtain unit 10 for a vehicle 12. The air curtain unit 10 includes an inflator assembly 14 and an air curtain 16 in fluid communication with the inflator assembly 14. A clip 18, 218, 318, 418 includes a hook 20 extending at least partially around the air curtain 16. The clip 18, 218, 318, 418 includes a mounting portion 22 fixed to the hook 20 and engaged with the inflator assembly 14.

Figure 2:
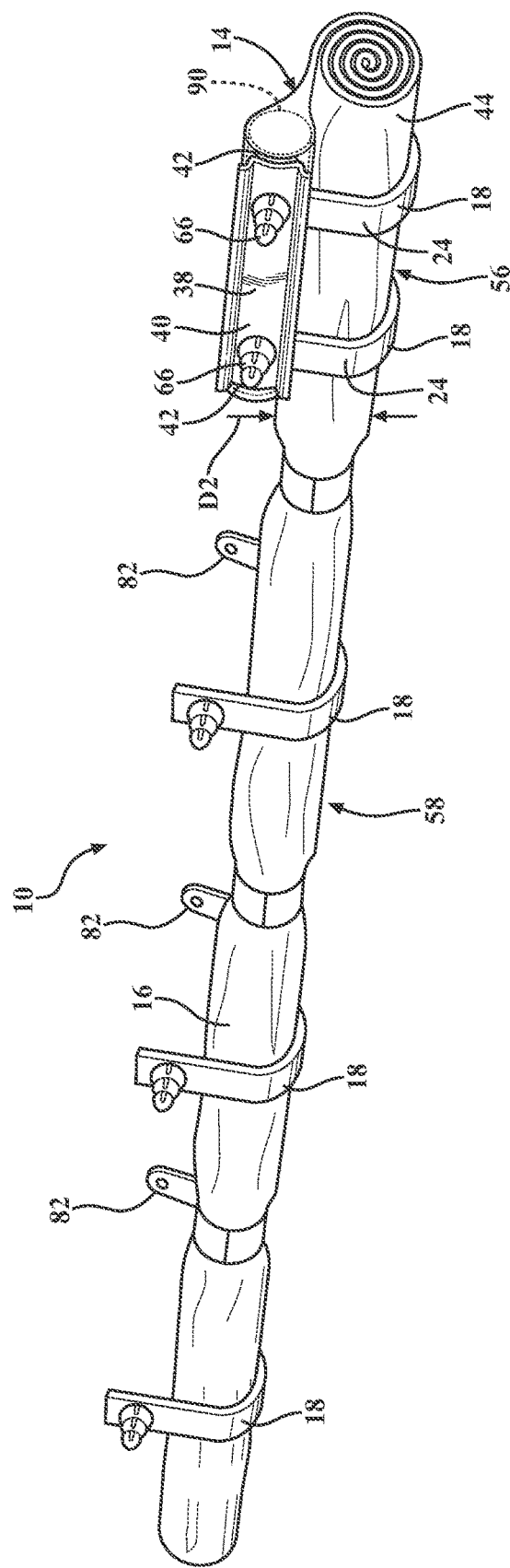
FIG. 2 is a perspective view of the air curtain unit including an inflator, an air curtain in fluid communication with the inflator, and a clip engaged with the inflator and the air curtain.
Figure 4:
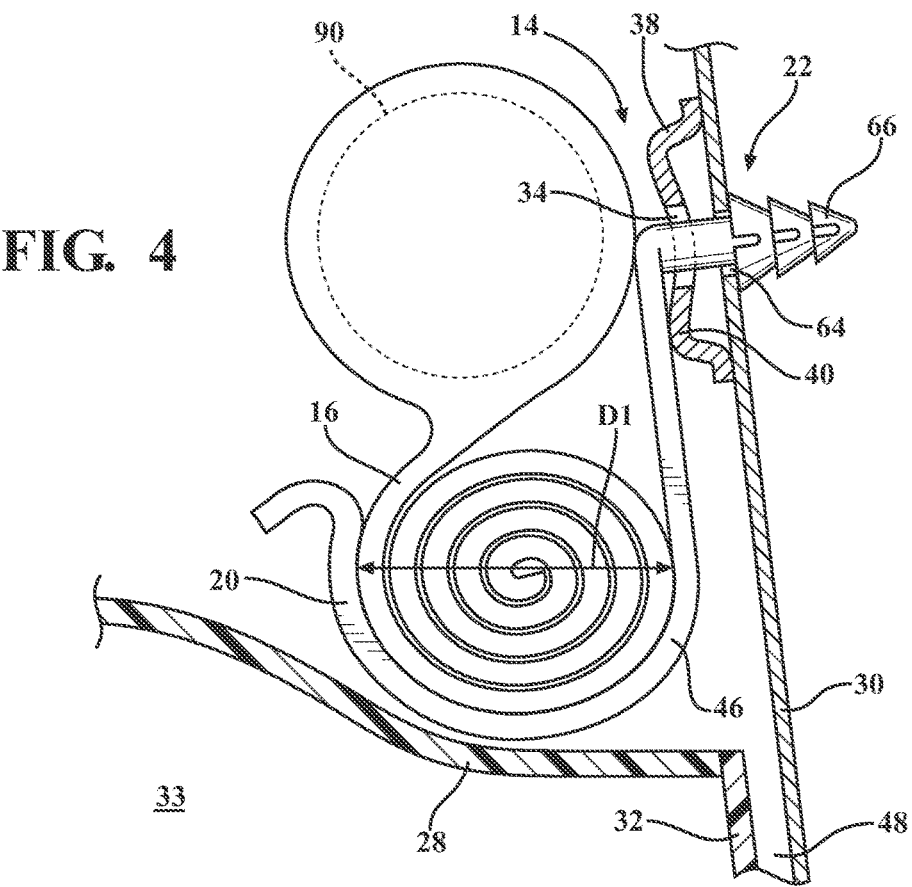
FIG. 4 is a cross-sectional view of the air curtain unit mounted to the vehicle with the air curtain in the undeployed state taken along line 4 of FIG. 1.
Figure 6:
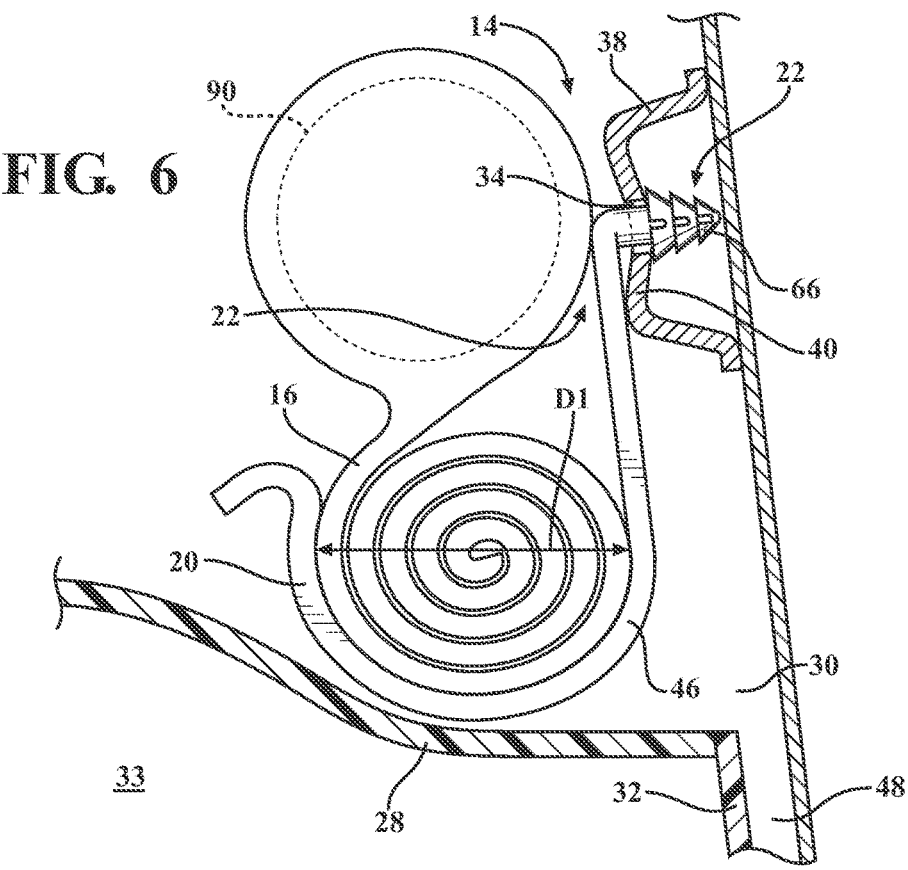
FIG. 6 is a cross-sectional view of another embodiment of the side curtain unit mounted to the vehicle.
Figure 7:
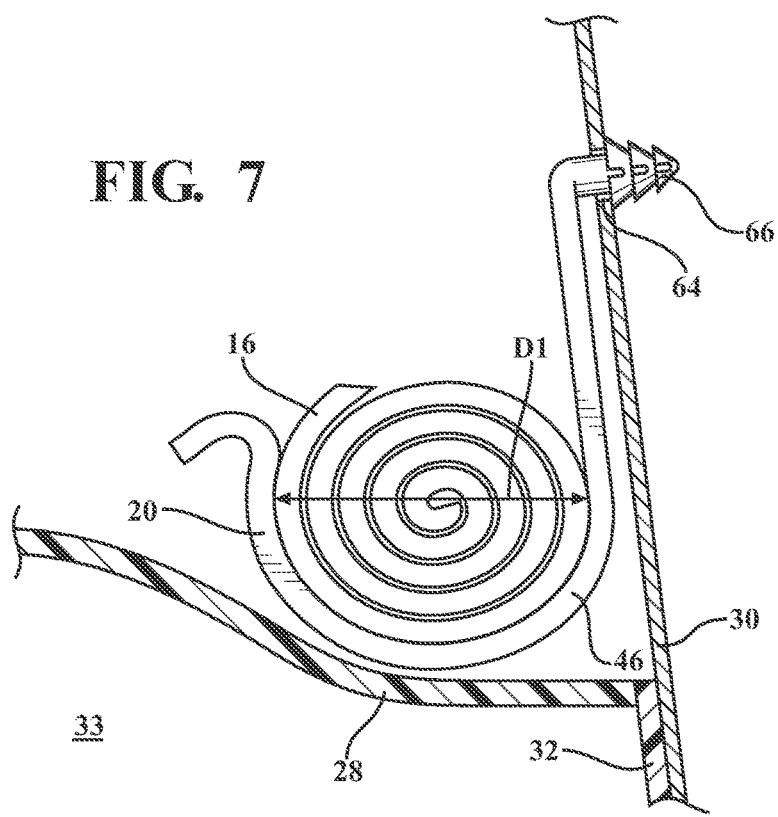
FIG. 7 is a cross-sectional view of the air curtain unit mounted to the vehicle with the side air curtain in the undeployed state taken along line 7 of FIG. 1.

As shown in FIG. 2, by extending around the air curtain 16 the hook 20 of the clip 18, 218, 318, 418 supports the air curtain 16. Specifically, the hook 20 may support the air curtain 16 in a desired position relative to the rest of the vehicle 12, i.e., orients the air curtain 16 in a desired position, to accommodate packaging constraints and to direct the air curtain 16 in a desired direction during inflation, as set forth further below. In addition, the mounting portion 22 may engage the inflator assembly 14 and/or the vehicle 12, as set forth further below. Since the mounting portion 22 is fixed to the hook 20, the mounting portion 22 also supports the hook 20 and the air curtain 16 relative to the inflator assembly 14. As shown in FIG. 4, the clip 18, 218, 318, 418 may both mount the inflator 14 to the vehicle 12 and support the air curtain 16 relative to the inflator assembly 14. As shown in FIG. 6, the clip 18, 218, 318, 418 may support the air curtain 16 relative to the inflator assembly 14 and the inflator assembly 14 may be mounted to the vehicle 12. As shown in FIG. 7, the clip 18, 218, 318, 418 may support the air curtain 16 relative to the vehicle 12, e.g., the clip 18, 218, 318, 418 may be spaced from the inflator assembly 14 and engaged directly with the vehicle 12. As shown in FIGS. 1 and 2, the air curtain unit 10 may include a plurality of clips 18, 218, 318, 418 spaced from each other. The air curtain unit 10 may include any suitable number of clips, 18, 218, 318, 418, i.e., one or more clips.

Figure 8A:
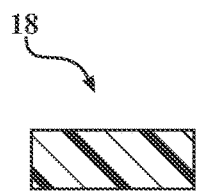
FIG. 8A is a cross-sectional view of one embodiment of the clip.
Figure 8B:
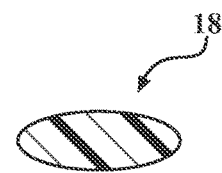
FIG. 8B is a cross-sectional view of another embodiment of the clip.
Figure 8C:
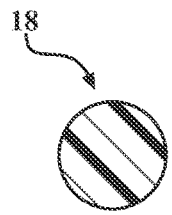
FIG. 8C is a cross-sectional view of another embodiment of the clip.
Figure 8D:
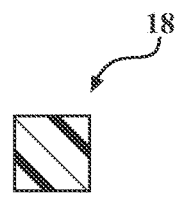
FIG. 8D is a cross-sectional view of another embodiment of the clip.
Figure 9:
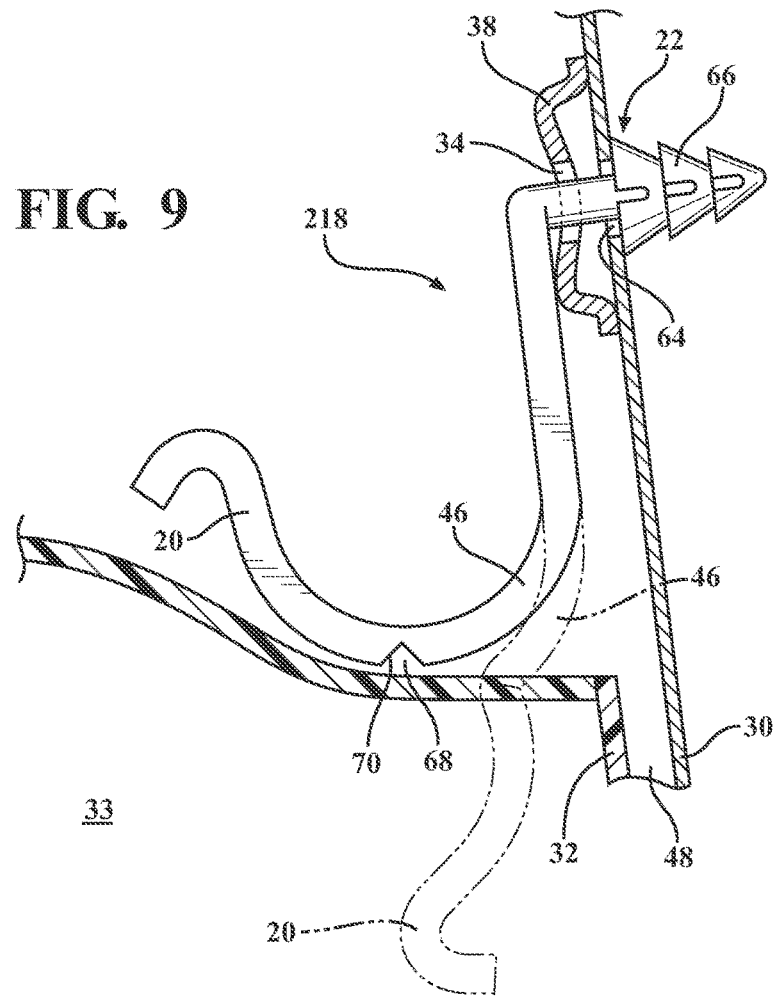
FIG. 9 is a perspective view of another embodiment of the clip including an indentation region.
Figure 10:
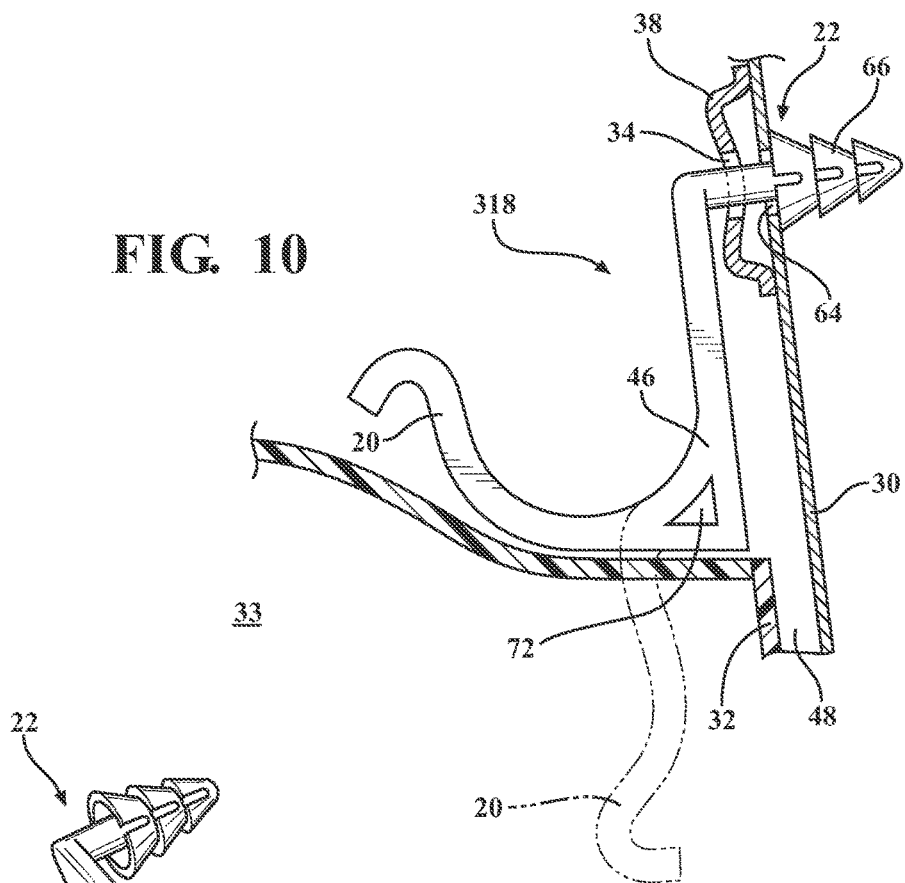
FIG. 10 is a perspective view of another embodiment of the clip including a ramp.
Figure 11:
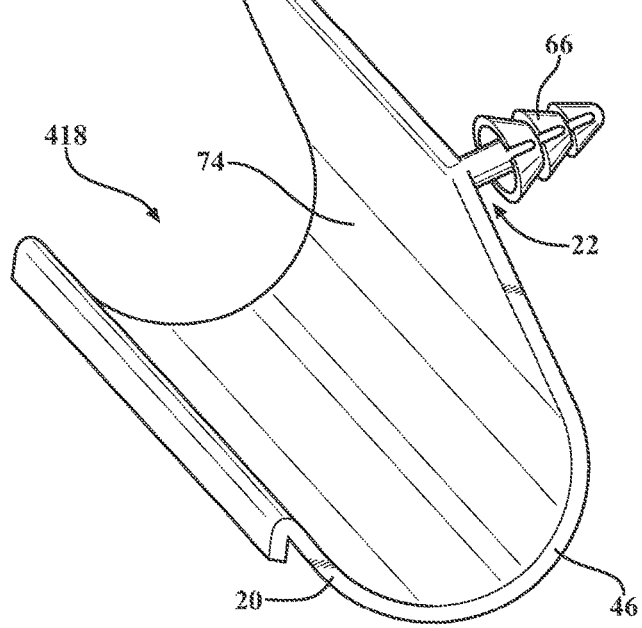
FIG. 11 is a perspective view of another embodiment of the clip.

As set forth further below, a first embodiment of the clip 18 is shown in FIGS. 1-7, a second embodiment of the clip 218 is shown in FIG. 9, a third embodiment of the clip 318 is shown in FIG. 10, and a fourth embodiment of the clip 418 is shown in FIG. 11. Alternative cross-sectional shapes of the clips are shown in FIGS. 8A-D. Common numerals are used to identify common features in the various embodiments.

With reference to FIG. 1, and as set forth above, the air curtain unit 10 may be mounted to the vehicle 12. Specifically, the vehicle 12 may include a body 62, e.g., a roof 26 and/or an upper body side 88, and the air curtain unit 10 may be mounted to the body 62, e.g., the roof 26 and/or upper body side 88. The upper body side 88 may include one or more pillars 30, e.g., the A-pillar, B-pillar, C-pillar, etc. The air curtain unit 10 may be, for example mounted at least to one of the pillars 30. As another example, the roof 26 may include roof beams (not numbered) and the air curtain unit 10 may be mounted to the roof beams. The vehicle 12 may include a headliner 28 and the air curtain unit 10 may be disposed between the roof 26, the upper body side 88, and the headliner 28.

As shown in FIGS. 1 and 2, the air curtain unit 10 may include one or more clips 82, which may be formed of metal or plastic and stitched to the air curtain 16. The clips 82 may be fixed to the body 62 in any suitable manner, e.g., fasteners. The clips 82 may be spaced from the clips 16. The clips 82, for example, may be alternately arranged with the clips 16.

Figure 3:
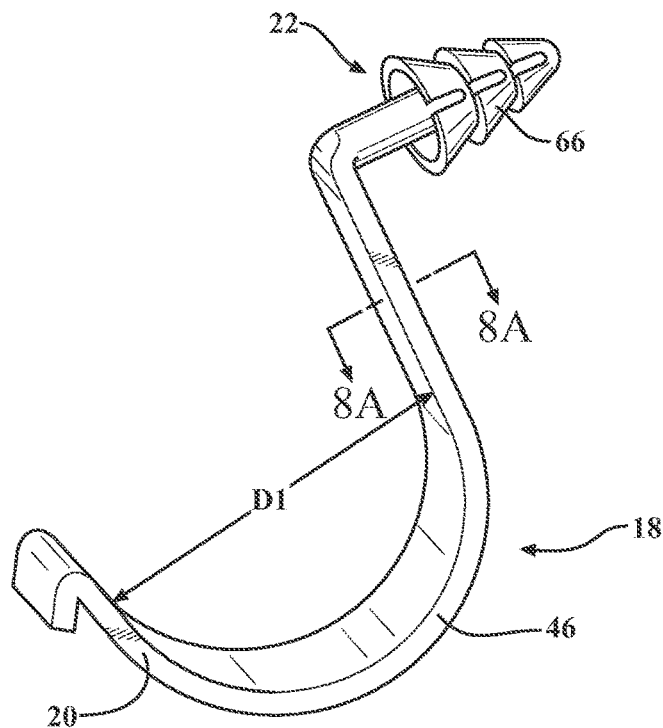
FIG. 3 is a perspective view of the clip.
Figure 5:
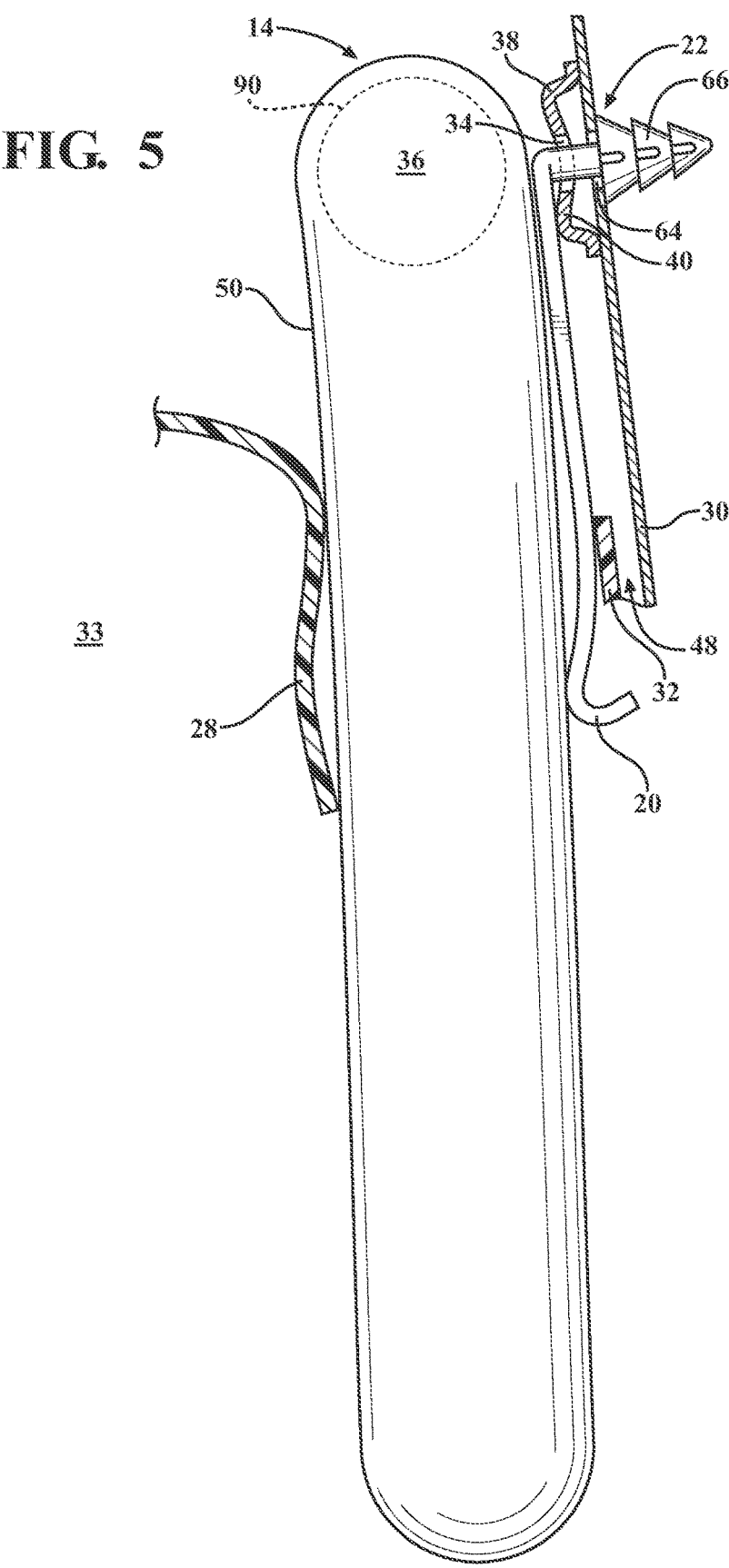
FIG. 5 is a cross-sectional view of the air curtain in the deployed state.

The air curtain unit 10 is shown in FIGS. 1 and 3 in an undeployed position. As set forth further below and as shown in FIG. 5, the air curtain unit 10 may be inflated to a deployed position in which the airbag 50 extends downwardly from the headliner 28 between an occupant of the vehicle 12 and a door and/or the body 62, e.g., pillars 30 (shown in FIGS. 3 and 4). The vehicle 12 shown in FIG. 1 includes two air curtain units 10, i.e., one mounted on a left side of the vehicle 12 and one mounted on a right side of the vehicle 12. The vehicle 12 may include any suitable number of airbag units 10, i.e., one or more.

With reference to FIGS. 3 and 4, the vehicle 12 may include trim 32 disposed below the headliner 28 and extending downwardly into a passenger compartment 33 of the vehicle 12. The trim 32 may, for example, extend adjacent the pillar 30 and may be mounted to the pillar 30. The headliner 28 may be formed of any suitable material such as a polymer, e.g., foam, plastic, etc. The trim 32 may be formed of any suitable material such as a polymer, e.g., nylon, acrylonitrile butadiene styrene (ABS), vinyl, etc. The vehicle 12 may be of any suitable type, e.g., a car, truck, SUV, etc.

As set forth above and as shown in FIG. 2, the air curtain unit 10 includes the inflator assembly 14 in communication with the air curtain 16 to expand the air curtain 16 with the inflation medium, such as a gas. The inflator assembly 14 may be, for example, a pyrotechnic inflator that uses a chemical reaction to drive inflation medium to the airbag. The inflator assembly 14 may be of any suitable type, for example, a cold-gas inflator. The inflator assembly 14 may, for example, include a canister 90, a nozzle (not numbered), and a bracket 38 fixed relative to the canister 90.

As set forth above, the clip 18 may mount the inflator assembly 14 to the vehicle 12. Specifically, as shown in FIGS. 4 and 5, the inflator assembly 14 may define a hole 34 and the mounting portion 22 of the clip 18 may extend through the hole 34 to support the inflator assembly 14 on the vehicle 12. For example, with reference to FIGS. 2-4, the inflator assembly 14 may include a body 36 and a bracket 38 fixed to and spaced from the body 36. The bracket 38 may define the hole 34. The mounting portion 22 of the clip 18 and the bracket 38 may be engaged by insertion of the mounting portion 22 through the hole 34. In addition, or in the alternative, the bracket 38 and the mounting portion 22 of the clip 18 may be engaged with each other by fastening, welding, or otherwise.

With reference to FIG. 2, the bracket 38 may include a rail portion 40 spaced from the body 36 and two leg portions 42 extending from the rail portion 40 to the body 36. The rail portion 40 may define the hole 34. The rail portion 40 and the leg portions 42 may be integrally formed with each other, i.e., formed simultaneously as a single unit. The bracket 38 may be formed separately from the body 36 and subsequently engaged with the body 36, e.g., by welding, fastening, and/or adhesive, etc. Alternatively, the bracket 38 may be integrally formed with the body 36, i.e., formed simultaneously as a single unit.

As shown in FIG. 2, the air curtain unit 10 may include one inflator 14 in communication with the air curtain 16. The air curtain unit 10 may include any suitable number of inflators 14, i.e., one or more. The air curtain 16 may include extensions 44 that extend away from the inflators 14 at the ends of the air curtain unit 10.

The air curtain 16 may be in communication with the inflator assembly 14 in any suitable fashion. For example, the air curtain 16 may surround at least a portion of the inflator assembly 14, as shown in FIG. 2. The air curtain 16 may be rolled, folded, and/or bunched below the inflator assembly 14 when mounted in the vehicle 12. As set forth further below, the clip 18 supports the air curtain 16 when rolled and/or bunched in the undeployed position.

The air curtain 16 may be formed of any suitable type of material, e.g., from a woven polymer. For example, the air curtain 16 may be formed of woven nylon yarn, e.g., nylon 6, 6. Other suitable examples include polyether ether ketone (PEEK), polyetherketoneketone (PEKK), polyester, or any other suitable polymer. The woven polymer may include a coating, such as, for example, silicone, neoprene, urethane, etc. For example, the coating may be polyorgano siloxane.

With reference to FIGS. 3-5, as set forth above, the clip 18 includes the mounting portion 22 and the hook 20. A bend 46 is disposed between the mounting portion 22 and the hook 20. The shape and dimensions of the clip 18, e.g., the hook 20, mounting portion 22, and bend 46, may position the air curtain 16 in a desired position relative to the headliner 28 and/or the trim 32. For example, the hook 20, mounting portion 22, and/or bend 46, may be shaped and dimensioned to position the air curtain unit 10, e.g. the inflator assembly 14 and/or the air curtain 16, in a position to accommodate packaging constraints created by the location of the headliner 28 and/or the trim 32 when the air curtain unit 10 is in the undeployed position. As another example, the hook 20, mounting portion 22, and/or bend 46 may be shaped and dimensioned to position the air curtain unit 10, e.g., the inflator assembly 14 and/or the air curtain 16, in a desired position when the air curtain unit 10 is in the deployed position, e.g., to guide the air curtain 16 away from a gap 48 between the trim 32 and the pillar 30 such that the trim 32 is disposed between the inflated airbag 50 and the pillar 30, as shown in FIG. 4.

With reference to FIGS. 2 and 3, the clip 18 may compress the air curtain 16 when the air curtain unit 10 is in the undeployed position. Specifically, the clip 18 may be configured to compress the air curtain 16, e.g., dimensioned and shaped such that a diameter D1 of the hook 20 is less than a diameter D2 of the air curtain 16 in a relaxed state when the air curtain unit 10 is in the undeployed position. For example, with reference to FIG. 3, as set forth above the air curtain 16 may be rolled and/or bunched when the air curtain unit 10 is in the undeployed position. The diameter D1 of the hook 20 may be configured to compress the rolled and/or bunched air curtain 16, e.g., the diameter D1 of the hook 20 may be smaller than the diameter of the rolled and/or bunched air curtain 16 when the air curtain unit 10 is in the undeployed position.

In this configuration, the air curtain 16 includes a compressed region 56 that is compressed by the hook 20 and an uncompressed region 58 that is spaced from the hook 20. The compressed region 58 has the diameter D2, which is larger than the diameter D1 of the clip 18. As shown in FIG. 2, for example, each air curtain unit 10 may include four clips 18 and, in such a configuration, the air curtain 16 includes four compressed regions 56, i.e., at each hook 20, and an uncompressed region 58 extending between each compressed region 56. The proportion of compressed region 56 to uncompressed region 58 depends in part on parameters such as the location of the clips 18 relative to the location of the air curtain 16 and/or inflator assembly 14 as well as on the size of the air curtain 16. Parameters may be altered to affect air curtain 16 compression, support, and/or guidance.

By compressing the air curtain 16, the hook 20 may retain the air curtain 16 in a desired location for packaging constraints and inflation guidance, as discussed above. For example, the hook 20 may be located at a desired location, e.g., along a pillar 30, at which the compression of the air curtain 16 allows the air curtain unit 10 to be properly fit within packaging constraints and to inflate in a desired manner.

As set forth above, the clip 18 may support the air curtain 16. For example, the hook 20 may support the air curtain 16. As shown in FIG. 4, for example, the hook 20 of the clip 18 may support the air curtain 16 and the inflator assembly 14 relative to the body 62, e.g., the pillar 30. In this configuration, the hook 20 also supports the air curtain 16 in position relative to the inflator assembly 14. In this configuration, the mounting portion 22 engages the body 62, e.g., the pillar 30. For example, the mounting portion 22 may pre-fix the air curtain unit 10 on the body 62, e.g., the pillar 30, during the vehicle assembly process and the bracket 38 may be subsequently secured to the body 62, e.g., the pillar 30, for example, with a bolt or other suitable fastener.

As another example of the clip 18 supporting the air curtain 16, as shown in FIG. 6, the hook 20 of the clip 18 may support the air curtain 16 relative to the bracket 38. In this configuration, the mounting portion 22 engages the bracket 38 and the bracket 38 is fixed to the body 62, e.g., the pillar 30. In this configuration, the bracket 38 may include other fasteners, clips, and/or hooks for pre-fixing the air curtain unit 10 on the body 62, e.g., the pillar 30, during the vehicle assembly process. In this configuration, the bracket 38 may be subsequently secured to the body 62, e.g., the pillar 30, for example with a bolt or other suitable fastener.

As another example of the clip 18 supporting the air curtain 16, as shown in FIG. 7, the hook 20 of the clip 18 may support the air curtain 16 relative to the body 62, e.g., the pillar 30. In FIG. 7, for example, the clip 18 is spaced from the inflator assembly 14. In this configuration, the mounting portion 22 engages the body 62, e.g., the pillar 30.

The clip 18 may be configured to deform when the air curtain 16 is inflated. Specifically, the material type and dimension of the clip 18 may be designed to allow forces from the air curtain 16 during inflation to deform the clip 18. For example, the hook 20 of the clip 18 deforms during inflation of the airbag. In the alternative, or in addition, any part of the clip 18 may deform during inflation of the airbag.

The mounting portion 22 of the clip 18 may be configured to engage the body 62 of the vehicle 12, e.g., the pillar 30. The body 62 may, for example, define a hole 64 that receives the mounting portion 22. The mounting portion 22 may be configured to be retained in the hole 64, as shown in FIG. 4. For example, the clip 18 may include a fastener 66 that engages the hole 64 when the mounting portion 22 is inserted in the hole 64. As one example, the fastener may be a Christmas tree fastener. Other examples of the fastener 66 may include various clips, plugs, etc. The fastener 66 may be of any suitable type that retains the mounting portion 22 in the hole 64.

The clip 18 may be formed of any suitable material. For example, the clip 18 may be a polymer, e.g., nylon 6,6, polyoxymethylene (POM, also referred to as acetal), etc.

With reference to FIGS. 8A-8D, for example, the clip 18 may have any suitable cross-sectional shape. For example, the cross-sectional shape of the clip 18 may be circular (FIG. 8A), oval (FIG. 8B), rectangular (FIG. 8C), or rounded rectangular (FIG. 8D). Alternatively, the clip 18 may have any suitable cross-sectional shape.

With reference to FIG. 9, the clip 218 may include a weakened region 68. The weakened region 68 may be configured to deform more readily than the remainder of the clip 18. In other words, the weakened region 68 facilitates and localizes deformation of the clip 218 when the air curtain unit 10 is inflated to the deployed position. The weakened region 68 may be located at a desired position to guide the air curtain 16, e.g., relative to the pillar 30 and/or trim 32, when the air curtain 16 is inflated.

The clips 18 may be assembled to the inflator assembly 14 and the air curtain 16 before installation into the vehicle 12. For example, the mounting portion 22 may be inserted into the hole 34 in the bracket 38 and the hook 20 may be located around the air curtain 16. Subsequently, the air curtain unit 10 may be installed to the vehicle 12 by inserting the mounting portions 22 of the clips 18 into the respective holes 64 in the body of the vehicle 12 such that the fasteners 66 engage the holes 64.

The weakened region 68 may be an indentation 70, i.e., an area of reduced cross-section. In addition, or in the alternative, the weakened region 68 may be formed of a material that is flexible relative to the material of the rest of the clip 218. For example, the weakened region may be formed of a resin, rubber, etc.

With reference to FIG. 10, the airbag unit 310 may include a ramp 72 that is adjacent to the hook 20. The ramp 72 may encourage localized deformation of the hook 20 when the air curtain 16 is inflated and/or may guide the air curtain 16 when the air curtain 16 is inflated. For example, as shown in FIG. 10, the ramp 72 may abut the body of the vehicle 12, e.g., the pillar 30. When the air curtain 16 is inflated, the ramp 72 may encourage the hook 20 to deform at the ramp 72 and the ramp 72 may guide the air curtain 16 away from the gap 48 between the trim 32 and the pillar 30.

With reference to FIG. 11, the clip 418 may include one or more mounting portions 22 spaced from one another. In this configuration an intermediate portion 74 may extend between the mounting portions 22 along the air curtain 16. The intermediate portion 74 may support and/or compress the air curtain 16 between the mounting portions 22 when the air curtain unit 10 is in the undeployed position and may deform to allow the air curtain 16 to inflate.

Figure 12:
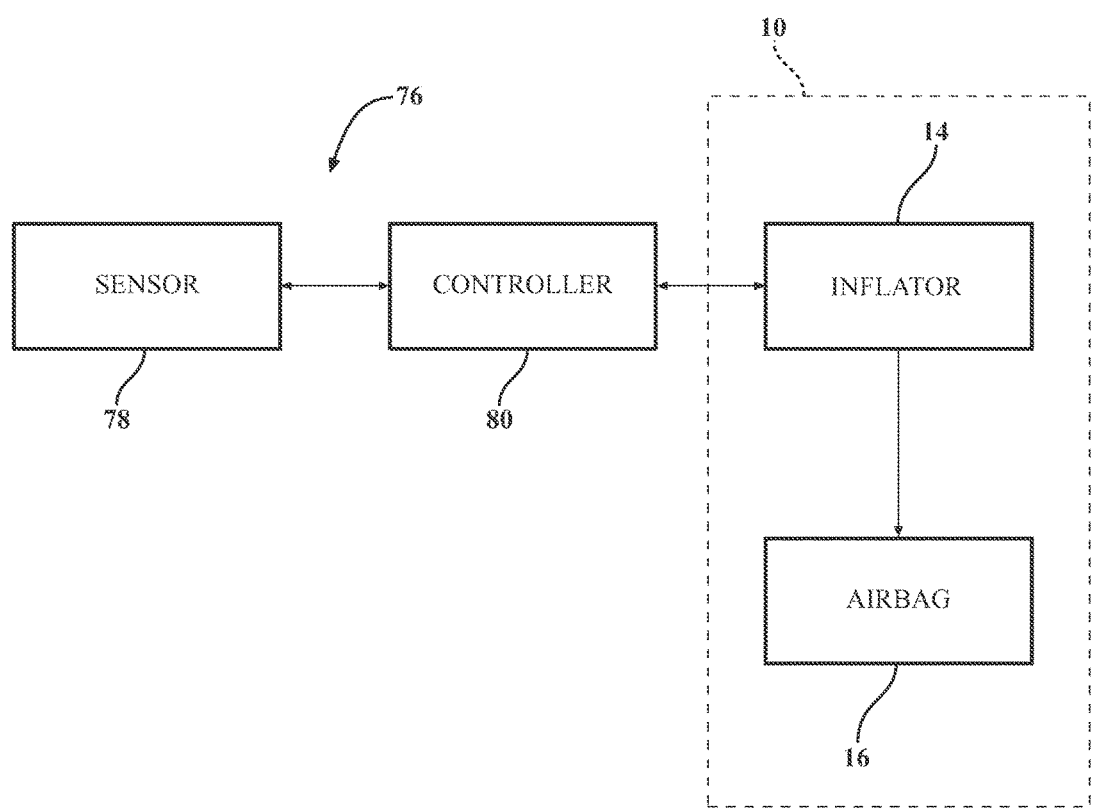
FIG. 12 is a schematic view of an impact sensing system of the vehicle.

With reference to FIG. 12, the vehicle 12 may include an impact sensing system 76 that may sense an impact of the vehicle 12 and may trigger inflation of the air curtain 16 in response to a sensed impact. In addition, the impact sensing system 76 may sense the type of impact, e.g., based on direction, magnitude etc.

The impact sensing system 76 may include at least one impact sensor 78 for sensing impact of the vehicle 12. The impact sensor 78 is the only component of the impact sensing system 76, however, it should be appreciated that the impact sensing system 76 may include additional components.

The controller 80 and the sensor 78 may be connected to a communication bus, such as a controller area network (CAN) bus, of the vehicle 12. The controller may use information from the communication bus to control the activation of the inflator assembly 14. The inflator assembly 14 may be connected to the controller 80 or may be connected directly to the communication bus.

The controller 80 may be in communication with the sensor 78 and the inflator assembly 14, directly or through the communication bus, for activating the inflator assembly 14, e.g., for providing an impulse to a pyrotechnic charge of the inflator assembly 14, when the sensor 78 senses an impact of the vehicle 12. Alternatively or additionally to sensing impact, the impact sensing system 76 may be configured to sense impact prior to impact, i.e., pre-impact sensing. The sensor 78 may be of any suitable type, e.g., using radar, lidar, and/or a vision system. The vision system may include one or more cameras, CCD image sensors, and/or CMOS image sensor, etc.

The controller 80 may be a microprocessor-based controller. The sensor 78 is in communication with the controller 80 to communicate data to the controller. Based on the data communicated by the sensor 78, the controller 80 instructs the inflator assembly 14 to activate.

In operation, when the air curtain unit 10 is in the undeployed position, the clips 18 position and support the inflator assembly 14 and the air curtain 16 in a desired position relative to the vehicle 12. When the impact sensing system 76 detects an impact or an imminent impact of the vehicle 12, the impact sensing system 76 provides instruction to the inflator assembly 14 to inflate the air curtain 16. With reference to FIG. 4, when the airbag 50 inflates, the airbag 50 deforms the hook 20 of the clip 18. During inflation of the airbag, the hook 20 may guide the airbag 50 in a desired direction, e.g., with the trim 32 disposed between the airbag 50 and the pillar 30.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An air curtain unit comprising:
   an inflator assembly;
   an air curtain in fluid communication with the inflator assembly and inflatable from an undeployed position to a deployed position; and
   a clip including a hook extending at least partially around the air curtain in the undeployed position, the air curtain deforming the clip in the deployed position;
   the clip including a mounting portion fixed to the hook and engaged with the inflator assembly; and
   the inflator assembly including a body and a bracket spaced from the body, the clip extending between the body and the bracket.

2. The air curtain unit as set forth in claim 1, wherein the inflator assembly is configured to be mounted to at least one of a roof and an upper body side of a vehicle.

3. The air curtain unit as set forth in claim 1, wherein the inflator assembly defines a hole and the mounting portion extends through the hole.

4. The air curtain unit as set forth in claim 1, wherein the bracket defines a hole and the mounting portion extends through the hole.

5. The air curtain unit as set forth in claim 4, wherein the clip includes a bend disposed between the mounting portion and the hook.

6. The air curtain unit as set forth in claim 1, wherein the clip includes a weakened region adjacent to the air curtain.

7. The air curtain unit as set forth in claim 6, wherein the weakened region includes an indentation.

8. The air curtain unit as set forth in claim 1, wherein the mounting portion includes a fastener configured to engage a vehicle.

9. The air curtain unit as set forth in claim 1, further comprising a ramp adjacent to the hook.

10. The air curtain unit as set forth in claim 1, wherein the clip is formed of a polymer.

11. The air curtain unit as set forth in claim 1, wherein the clip includes a second mounting portion spaced from the mounting portion and an intermediate portion extending from the mounting portion to the second mounting portion along the air curtain.

12. The air curtain unit as set forth in claim 1, wherein the hook compresses the air curtain.

13. An air curtain unit comprising:
    an inflator;
    an air curtain in fluid communication with the inflator and inflatable from an undeployed position to a deployed position; and
    a clip including a hook extending at least partially around the air curtain in the undeployed position, the hook supporting and compressing the air curtain;
    wherein the air curtain in the undeployed position includes a compressed region compressed by the hook and an uncompressed region spaced from the hook, the uncompressed region having a larger diameter than the compressed region;
    the air curtain deforms the clip in the deployed position; and
    the inflator includes a body and a bracket spaced from the body, the clip being disposed between the body and the bracket.

14. The air curtain unit as set forth in claim 13, wherein the inflator is configured to be mounted to at least one of a roof and an upper body side of a vehicle.

15. The air curtain unit as set forth in claim 13, wherein the clip includes a weakened region adjacent to the air curtain.

16. The air curtain unit as set forth in claim 15, wherein the weakened region includes an indentation.

17. The air curtain unit as set forth in claim 13, further comprising a ramp adjacent to the hook.

* * * * *